Dec. 12, 1933.  F. O. HOCHMUTH ET AL  1,938,905
BRAKE SEAL
Filed Oct. 3, 1930
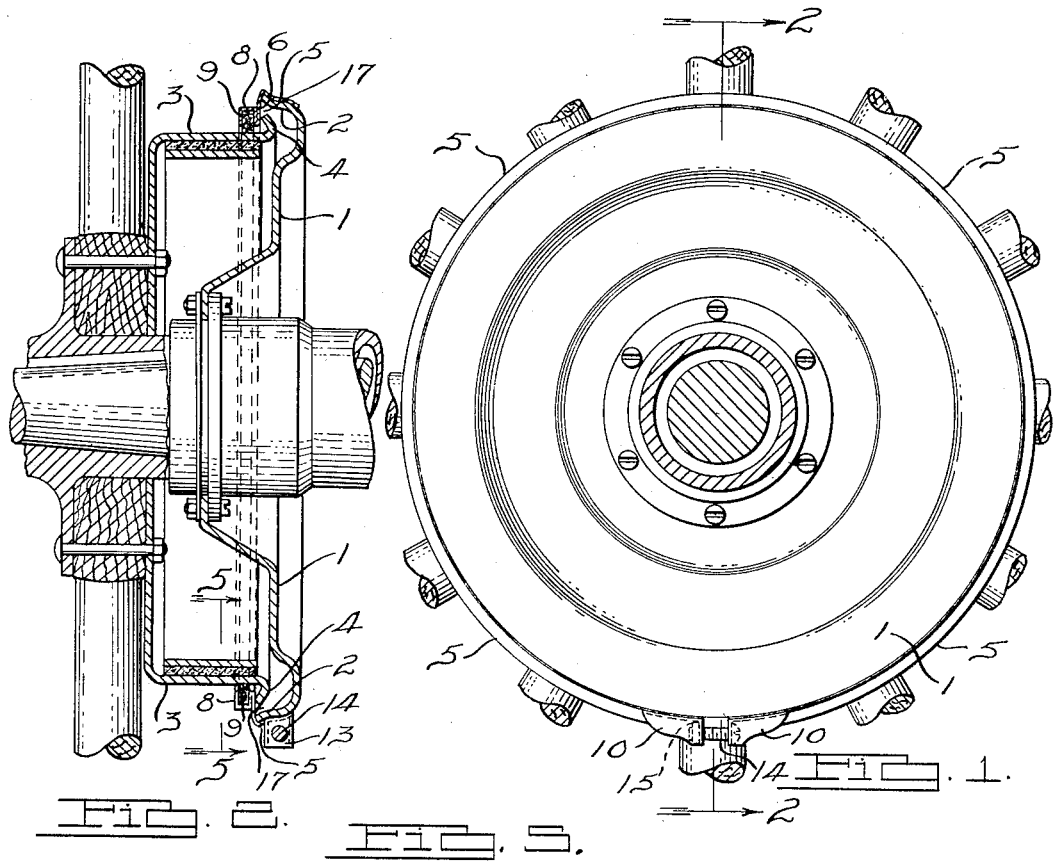
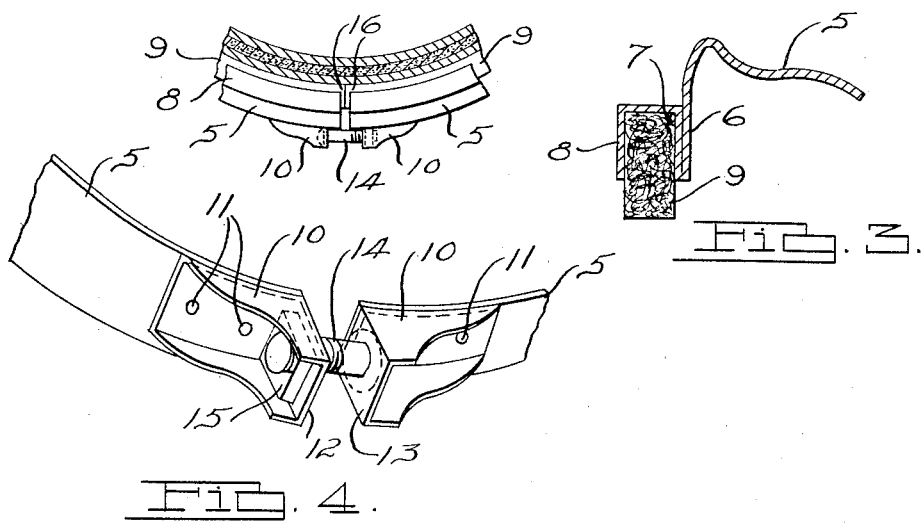
INVENTORS.
Frank O. Hochmuth,
Carl F. Otto.
BY
ATTORNEY Patented Dec. 12, 1933

1,938,905

UNITED STATES PATENT OFFICE 1,938,905

BRAKE SEAL

Frank O. Hochmuth and Carl F. Otto, Detroit, Mich.

Application October 3, 1930. Serial No. 486,083

4 Claims. (Cl. 188—218)

This invention relates to brake seals and the object of the invention is to provide a seal to prevent foreign matter from entering a brake between the rotatable brake drum and the stationary brake housing.

Another object of the invention is to provide a seal for automobile brakes which completely seals the brake against the weather so that the brake will operate uniformly and independently of outside conditions.

A further object of the invention is to provide a sealing member detachably secured to the brake housing and carrying a lubricant impregnated packing ring riding in contact with the outer surface of the brake drum and providing a seal between the drum and housing.

A further object of the invention is to provide a lubricant impregnated sealing ring which applies lubricant to the surface of the brake drum beneath the ring and prevents water from collecting and freezing between the brake drum and the ring.

A further object of the invention is to provide a brake seal which is clamped to the brake housing and rides in yielding contact with the brake drum and encloses the space between the housing and drum to seal the brake against the entrance of water, sand, grit or other foreign matter.

These objects and the several novel features of the invention are hereinafter more fully described and claimed and the preferred form of construction by which these objects are attained is shown in the accompanying drawing in which—

Fig. 1 is an elevation of a brake housing to which the brake seal is detachably secured.

Fig. 2 is a section taken on line 2—2 of Fig. 1.

Fig. 3 is an enlarged section through the packing ring and metal band.

Fig. 4 is a perspective view of the means for adjusting the metal band on the brake drum.

Fig. 5 is a section taken on line 5—5 of Fig. 2.

As shown in Figs. 1 and 2, a stationary brake housing 1 is provided having an annular flange 2. The brake drum 3 is secured to the wheel and is provided with a return bent edge 4 extending within the annular flange 2 of the brake housing. The brake housing is stationary while the brake drum 3 rotates with the wheel. The sealing device comprises a metal band 5 which is annular in form and is shaped to fit the outer face of the housing flange 2. This band is provided with a depending flange 6 extending inwardly from the flange 2 of the brake housing and the portion 7 of the band is return bent and is shaped to provide a channel 8 to receive the annular felt strip 9 as shown in Fig. 3. This felt strip 9 extends into contact with the outer face of the brake drum 3 and is preferably impregnated with graphite, oil or other lubricant so as to lubricate the face of the drum 3 where it rides in contact with the felt strip. As shown in Fig. 4 a pair of brackets 10 are secured to the opposite ends of the metal band 5 by means of the rivets 11. These brackets are shaped to provide adjacent end faces 12 and 13 which are each provided with a central aperture through which the bolt 14 may be inserted. This bolt 14 is inserted through these apertures and a nut 15 is positioned within one of the brackets and the bolt is threaded thereinto to draw the band 5 into tight engagement with the peripheral flange 2 of the brake housing.

This bolt provides an adjustment whereby the band may be taken up on the housing and, as shown in Fig. 5, the ends 16 of the felt strip 9 extend beyond the ends of the metal band 5 and flange 6 and form a continuous contact throughout the circumference of the brake drum to provide a seal. It will thus be seen that by making the felt strip, which is flexible, slightly longer than the metal band which is rigid, the felt strip extends completely about the brake drum even under a considerable variation of the adjustable bolt 14 as will be understood from Fig. 5. This device seals the space 17 between the stationary brake housing and the rotatable brake drum and prevents water, grit, dirt or other foreign matter from entering the brake drum through this annular space 17 and insures uniform operation of the brake irrespective of outside conditions. For instance, when water gets into the brake drum it acts sometimes as a lubricant between the brake lining and inner drum face and prevents the brakes from taking hold upon application of the brake pedal, and with some types of brake lining the water tends to swell the brake lining causing the brakes to grab suddenly even upon very slight movement of the brake pedal. This device keeps the water out and prevents this condition from occuring. Also by keeping out the grit, dirt and gravel it is impossible for foreign matter of this type to get between the brake lining and the brake drum and scoring the brake drum which would reduce its efficiency. By impregnating the felt strip 9 with graphite, oil or other lubricant an annular ring of lubricant is applied to the outer face of the brake drum so that water will not readily pass between the felt ring and the brake drum and as this lubricant repels the water, the water will not tend to accumulate beneath the felt ring and freeze when the wheels are not moving.

The metal band 5 including the channel holding the felt strip is preferably made from stainless steel or chromium plated so that it will not rust and presents a very ornamental appearance when applied to the brake.

From the foregoing description it becomes evident that the device is very simple and efficient in operation, will not easily get out of order, is composed of few parts and is of consequent low manufacturing cost and provides a device which accomplishes the objects described.

Having thus fully described our invention, its utility and mode of operation, what we claim and desire to secure by Letters Patent of the United States is—

1. A brake seal comprising in combination, a stationary brake housing having an annular peripheral flange, a rotatable brake drum having an annular flange terminating adjacent the flange of the brake housing, a sheet metal band shaped to fit the annular flange of the brake housing, a bracket on each end of the sheet metal band, a bolt connecting the brackets and providing a means for adjusting the band on the flange of the housing, the sheet metal band being provided with an inwardly extending flange shaped to provide an inwardly-facing channel, and a felt strip in the said channel and riding in contact with the outer face of the brake drum.

2. A brake seal comprising in combination, a stationary brake housing having an annular peripheral flange, a rotatable brake drum having an annular flange of smaller diameter than the flange of the brake housing and terminating adjacent thereto, a sheet metal band shaped to fit the annular flange of the brake housing, adjustable means on the metal band for securing the said band to the brake housing, a flange extending inwardly from the metal band and formed integrally therewith, the said flange being formed to provide an annular channel in its inner edge and a felt strip secured in the said channel and riding in contact with the outer face of the brake drum, the felt strip being impregnated with a lubricant.

3. A brake seal comprising an annular sheet metal band having a bracket at each end, a bolt connecting the brackets and providing a means for adjusting the diameter of the band, the band being provided with an inwardly extending flange return bent upon itself and formed to provide an annular channel and a lubricant impregnated felt strip secured in said annular channel and extending inwardly therefrom.

4. A brake seal comprising in combination, a stationary brake housing having an annular peripheral flange, a rotatable brake drum having an annular flange extending within the flange of the brake housing, a metal band shaped to fit the annular flange of the brake housing, adjustable means on the metal band for securing the said band to the brake housing, a flange extending inwardly from the metal band and formed integrally therewith, the said flange being formed to provide an annular channel extending in spaced relation with the periphery of the brake drum and a felt strip secured in the said channel and riding in contact with the outer face of the brake drum.

FRANK O. HOCHMUTH.
CARL F. OTTO.